US 7,024,636 B2

(12) United States Patent
Weed

(10) Patent No.: US 7,024,636 B2
(45) Date of Patent: Apr. 4, 2006

(54) CHIP MANAGEMENT SYSTEM

(75) Inventor: Dan Weed, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 80 days.

(21) Appl. No.: 10/301,182

(22) Filed: Nov. 20, 2002

(65) Prior Publication Data

US 2004/0098689 A1    May 20, 2004

(51) Int. Cl.
    *G06F 17/50*    (2006.01)
    *G06F 9/455*    (2006.01)
    *G06F 19/00*    (2006.01)

(52) U.S. Cl. .............. 716/1; 716/2; 716/4; 716/11; 706/921; 700/121

(58) Field of Classification Search ............ 716/1–2, 716/4–5, 11, 18; 706/919–921, 45, 47, 60; 700/119, 121, 95–107
    See application file for complete search history.

(56) References Cited

U.S. PATENT DOCUMENTS

| 5,222,030 | A   | 6/1993  | Dangelo et al. .............. 716/11 |
| 5,553,002 | A   | 9/1996  | Dangelo et al. |
| 5,625,565 | A   | 4/1997  | Van Dyke |
| 6,026,226 | A   | 2/2000  | Heile et al. |
| 6,253,358 | B1* | 6/2001  | Takahashi ...................... 716/6 |
| 6,269,467 | B1* | 7/2001  | Chang et al. ................... 716/1 |
| 6,574,778 | B1  | 6/2003  | Chang et al. |
| 6,634,008 | B1* | 10/2003 | Dole .............................. 716/1 |
| 6,678,875 | B1* | 1/2004  | Pajak et al. ................... 716/11 |
| 6,704,917 | B1* | 3/2004  | Curran et al. ................. 716/11 |
| 6,721,922 | B1* | 4/2004  | Walters et al. ................. 716/1 |
| 6,742,165 | B1* | 5/2004  | Lev et al. ....................... 716/1 |
| 6,834,380 | B1  | 12/2004 | Khazei |
| 2003/0097241 | A1* | 5/2003 | Koford et al. ................. 703/1 |
| 2004/0025119 | A1* | 2/2004 | Hamlin ......................... 716/1 |

FOREIGN PATENT DOCUMENTS

EP    1063599    12/2000

OTHER PUBLICATIONS

Funakoshi et al., "A Rule-Based VLSI Process Flow Validation System With Macroscopic Process Simulation," IEEE Transactions on Semiconductor Manufacturing, vol. 3, No. 4, Nov. 1990, pp. 239-246.*

"Method and Apparatus For Implementing A Metamethodology", by James Koford et al. U.S. Appl. No. 10/015,194, Filed: Nov. 20, 2001.

(Continued)

*Primary Examiner*—Leigh M. Garbowski
(74) *Attorney, Agent, or Firm*—Strategic Patent Group Inc.

(57) ABSTRACT

A method and system for automatically guiding a user through a design flow for an integrated circuit are disclosed. The method and system include displaying a design flow user interface on a user's computer, where the user interface includes symbols corresponding to design flow process steps. The design flow process steps are defined with a set of rules, and user input for each step is analyzed for compliance with the rules. The user is allowed to proceed to a next step in the flow once it is determined that the previous steps have been completed successfully.

11 Claims, 7 Drawing Sheets

OTHER PUBLICATIONS

"Hercules Software Guide", Sutton et al., Department of Electrical and Computer Engineering, Carnegie Mellon University, Jul. 19, 1996, pp. 1-34.

"Building Design Flows in Nelsis", Bosch et al., Delft Institute of Microelectronics and Submicron Technology, Sep. 10, 1996, pp. 1.1-6.5.

"Graphical Methodology Language for CAD Frameworks", Proceedings of the 7th International Conference—Author(s)—Bushnell, et al.

"Design Methodology Management", Kleinfeldt et al., Proceedings of the IEEE, vol. 82, No. 2, Feb. 1994, pp. 231-250.

"Incorporating Design Flow Management in a Framework Based CAD System", Bingley et al., Proceedings of the IEEE/ACM International Conference on Computer AideDesign, Nov. 8-12, 1992, pp. 538-545.

* cited by examiner

Estimated Requirements for Project L2A2334

Slice Fitter Results and Comparison with Masterslices

|  | Design | Masterslice | | |
| --- | --- | --- | --- | --- |
|  |  | Fits | Smaller | Larger |
| Parameter | L2A2334 | L79304 | L79302 | L79303 |
| Gate Count (K) | 1970 | 2000 | 2000 | 3000 |
| Number of I/O | 125 | 200 | 120 | 150 |
| Number of Clock Domains | 6 | 8 | 4 | 6 |
| Frequency of Fastest Clock (MHz) | 125 | 300 | 300 | 350 |
| Total Memory (K bits) | 256 | 1024 | 256 | 512 |

Business System Check on Masterslice L79304

Inventory: 58 Wafers

Return to L2A2334 Design Flow

FIG. 4B

Results of Isichipest Run at Fri Oct 11 15:29:38 2002 for Project L2A2334

Isichipest Results and Comparison with Masterslices

| Parameter Name | Design | | Masterslice | | | |
|---|---|---|---|---|---|---|
| | Authorized | Isichipest Estimate | Authorized | Fits | Smaller | Larger |
| Project/Slice Name | L2A2334 | L2A2334 | L79304 | L79303 | L79304 | L79305 |
| Gate Count (K) | 1970 | 2054 | 2000 | 3000 | 2000 | 9000 |
| Number of I/O | 125 | 125 | 200 | 150 | 200 | 1500 |
| Number of Clock Domains | 6 | 6 | 8 | 6 | 8 | 10 |
| Frequency of Fastest Clock (MHz) | 125 | 125 | 300 | 350 | 300 | 1000 |
| Total Memory (K bits) | 256 | 256 | 1024 | 512 | 1024 | 4096 |

Business System Check

Masterslice has changed. Business adjustment required.

Authorized Masterslice: L79304 New Masterslice: L79303

Design Completion Time: 15 Days

Return to L2A2334 Design Flow

FIG. 7

CHIP MANAGEMENT SYSTEM

CROSS-REFERENCE TO RELATED APPLICATIONS

The present invention is related to co-pending patent application Ser. No. 10/015,194 entitled "METHOD AND APPARATUS FOR IMPLEMENTING A METAMETHOD-OLOGY" filed on Nov. 20, 2001, by the assignee of the present application and included herein by reference in its entirety.

FIELD OF THE INVENTION

The present invention generally relates to the field of integrated circuit design, and more particularly to a method for automatically guiding a user through a design flow for an integrated circuit (IC).

BACKGROUND OF THE INVENTION

Integrated circuits have become a necessary part of everyday modern society. From cell phones and computers, to household appliances and automobiles, a wide range of integrated circuits are utilized to provide a broad range of functionality. To provide this functionality, integrated circuits may need to be specialized to have the functions necessary to achieve the desired results. Additionally, more and more functions are being included within each integrated circuit.

However, this has resulted in a level of design complexity previously unimagined. For example, to achieve the functions desired, multiple vendors may be used to provide Electronic Design Automation (EDA) software tools. The variety of such tools is supplied from a plurality of sources; this results in compatibility and management issues.

Further, to provide the desired product range, differing projects may require different methodologies. For instance, cost issues, the number of features to be included, and performance considerations all dictate the parameters desired in a chip by a consumer. Designing complex chips has become so ubiquitous and so pervasive that the provision of a "one size fits all" IC is unlikely as the functions desired in implementations continue to expand.

Moreover, EDA tool vendors are often "behind the curve" in the development of the tools needed to perform current designs. EDA tool designers need to receive feedback from users of the tools in order to correct and improve the tool designs. For instance, due to the nature of efficient tool design, a new EDA tool is typically built, and then utilized over several feedback cycles. By the time the tool matures, designers and other elements of the process may be a generation further along, and therefore require new EDA tools, which are just entering the feedback cycle.

The level of detail involved with the integrated circuit design process may further complicate a designer's tasks. Previously, to even begin addressing the level of complexity encountered, problems were broken down into sub-problems and tools and procedures were designed to address each sub-problem. However, existing tools were often unable to address problems encountered between fixes, and hastily-written tools were prepared to "patch" the problems. The result has been an exploding collection of software tools, tool interfaces and procedures from various sources, each striving to cope with an ever-changing requirements landscape stemming from design projects of exponentially increasing complexity.

Therefore, it is desirable to produce a comprehensive system that manages design flows and procedures, coordinates and communicates with business and manufacturing systems, as well as the computers and software required to implement the flows and procedures.

SUMMARY OF THE INVENTION

The present invention provides a method and system for automatically guiding a user through a design flow for an integrated circuit. The method and system include displaying a design flow user interface on a user's computer, where the user interface includes symbols corresponding to design flow process steps. The design flow process steps are defined with a set of rules, and user input for each step is analyzed for compliance with the rules. The user is allowed to proceed to a next step in the flow once it is determined that the previous steps have been completed successfully.

According to the system and method disclosed herein, the present invention is implemented as a web-based expert system that increases design productivity by employing a metamethodology focused on design flow supported by third party EDA tools. The expert system provides a deterministic, unified user-interface that integrates the functions required to design and build ICs. For example, the expert system may provide current design status to the user, manage complexity by employing a common design discipline, track and archive projects through production, and may measure production results by schedules, budgets, and the like. Since these functions are common to all design projects, they fit within the definition of metamethodology.

BRIEF DESCRIPTION OF THE DRAWINGS

FIG. 4B is a diagram illustrating the comparison of an example custom design with master slices.

FIG. 7 is a diagram illustrating an example of the chip estimator report.

DETAILED DESCRIPTION

Figure 1:
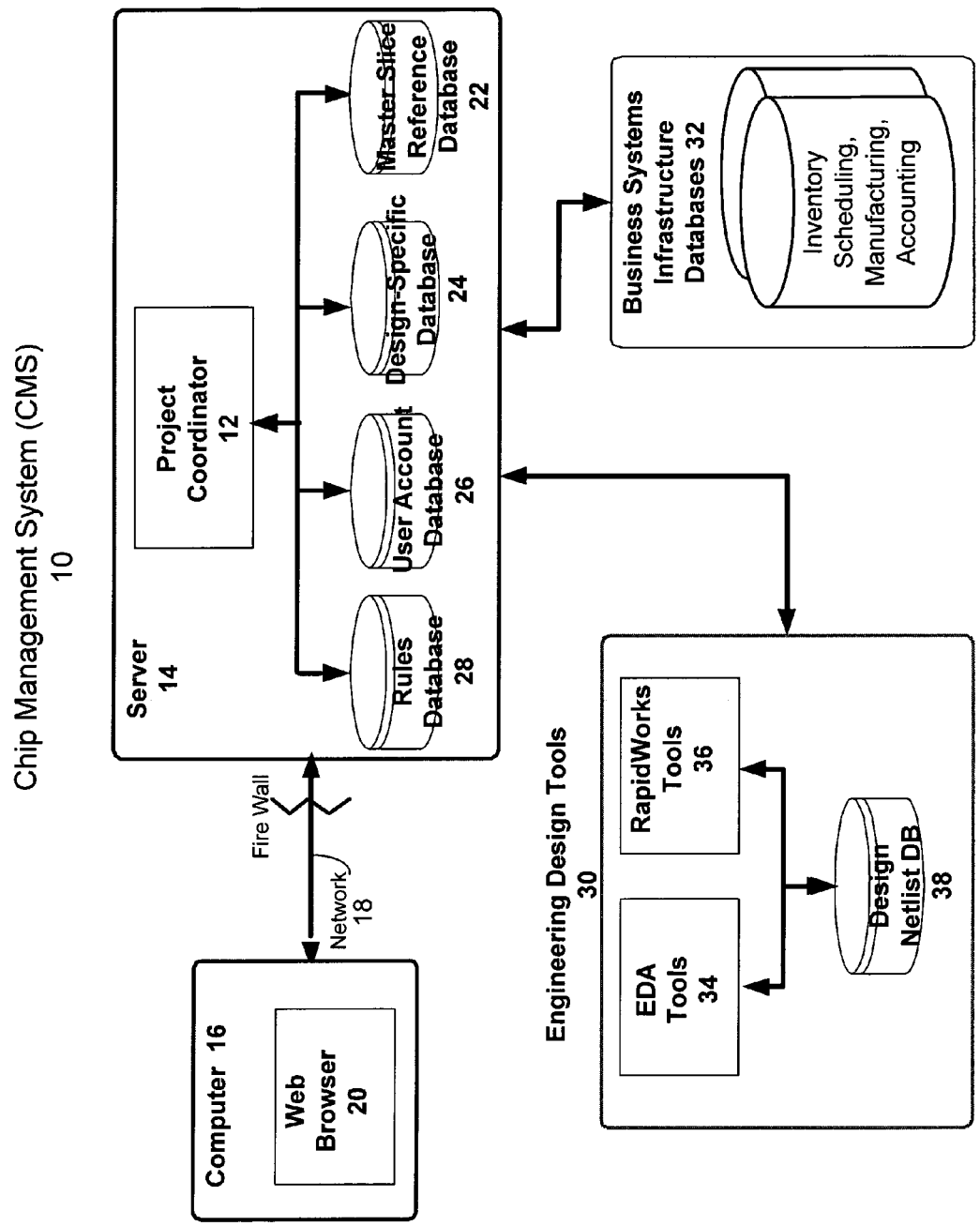
FIG. 1 is a block diagram of the chip management system (CMS) in accordance with one preferred embodiment of the present invention.

The present invention relates to automated design methodologies of integrated circuits. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

A fundamental problem resolved by the present invention is to provide a manufacturer with the ability to provide a wide range of IC products, by a wide range of designers to a variety of customers. For example, the present invention may provide a system to achieve actual variable semiconductor products, for example, field programmable gate arrays (FPGAs) application specific integrated circuits (ASICs), application specified standardized products (ASSPs), and the like, as well as a whole range of other kinds of products, each having different implications for how these sophisticated and complex design elements are driven.

A variable population of designers is generally utilized to drive the system to design the products, from expert level to beginner, and specifically trained versus generally trained kinds of designers. Furthermore, a manufacturer may encounter a myriad of customers, each having different requirements and expectations. Thus, to be effective, a design system must accommodate a variable population of designers (as to skill or specialized knowledge) working on a wide range of products whose design requirement vary extensively.

By utilizing the present invention, a general environment is provided which is capable of comprehending this extreme variation in a coherent, rule-based, definable form that is still traceable. To approach this many-bodied problem with its enormous complexity in its most general form, a method and apparatus is provided to allow defining of the kinds of variabilities previously mentioned, as well as other variabilities, in what for present discussion purposes will be referred to as a metamethodology.

A methodology may include a sequence of procedures applied to solve a particular problem in a given area. Additionally, if the problems in that area are numerous, many different methodologies may be necessary for solving the problem. Thus, a "metamethodology" may refer to a collection of methods that are common to all possible methodologies within that area, and the principles according to which that collection is organized and manipulated. In this way, a manufacturer may accommodate a variety of different customers, numerous different designers, a multiplicity of different third-party and internally-developed software, hardware, processes and the like, all kinds of different target processes and all types of different target products in one unified framework.

The present invention provides a web-based expert system, referred to herein as a chip management system that guides the user through the entire fabrication process flow for an integrated circuit chip, from design through manufacturing. The chip management system is based upon the MetaStream intelligent flow management system, as described in co-pending patent application Ser. No. 10/015,194 entitled "METHOD AND APPARATUS FOR IMPLEMENTING A METAMETHODOLOGY," referred to herein by reference. The chip management system (CMS) manages all components required for the design, and manufacturing of integrated circuit products to customers by managing process flows that include design, EDA tool coordination, business systems, inventory status updates, and release to manufacturing.

In a preferred embodiment, the CMS stores a number of reference chip designs that serve as the starting point for the design of a custom chip. The CMS includes sets of rules that control the display of a user interface to the user that graphically depict the necessary steps in the flow and the sequence that the steps are to be completed. The rules also define how the user inputs initial design parameters for the custom design, and verify that the values for the input parameters comply with design specifications for the reference chip design. The CMS invokes third-party EDA tools 34 at points in the flow for analysis, verification and simulation. Only after the system determines that the user has correctly performed a step in the flow, will the user be allowed to proceed to the next step. The user may at any time return to completed steps and modify previous entries to evaluate the impact the change will have on the custom chip. Once all of the required design and simulation steps have been verified and completed, the CMS will check necessary business systems and inform the user whether the required inventory of materials and manufacturing capacity are available to manufacture a specified number of the custom chips in the time frame specified by the user.

FIG. 1 is a block diagram of the chip management system in accordance with one preferred embodiment of the present invention. The CMS 10 includes a project coordinator application 12 that executes on a server 14 and is accessed by a user over a network, such as the Internet, using a conventional web browser 20. The project coordinator 12 facilitates the process flow and performs file management and checking. The project coordinator 12 communicates with several databases including a master slice reference database 22, a design-specific database 24, a user account database 26, and a rules database 28. The server 14 is capable of communicating with engineering design tools 30 and one or more business system infrastructure databases 32. The engineering design tools 30 include EDA tools 34, RapidWorks tools 36, and a netlist database 38. The business system database 32 preferably controls inventory status, scheduling, manufacturing, and accounting. The project coordinator 12 of the present invention continually runs in the background to check that all files, steps and other items are acceptable. This is a key feature of MetaStream as all data, files and session information is captured at the outset of each design to provide the user or manufacturer with the ability to track all activity, such as a material change to the design or a business condition changes.

The master slice reference database 22 is a static database that stores electrical and physical parameters defining reference chip designs, referred to as master slices, that represent one or more product families. Example parameters for a master slice may include Die Size, Package, Power Grid Structure, Interconnect, Signal Integrity, I/O Rating, and Clock Skew Management. Each unique master slice will have different combination of values for the same set of parameters. In a preferred embodiment, most of the parameters for the reference designs in the master slice database 22 will have a fixed parameter values across product lines to reduce complexity. Also, in a preferred embodiment, each master slice is referred to as being stored as a separate "slice".

The user account database 26 stores account information for each user including the user's ID and password. The account database also manages access privileges to both the user accounts and specific projects. Therefore, each user account will have user access settings and project settings. For example, access privileges for a particular account may be defined as multi-user and multi-project; multi-user and single project; single user and single project, or single user and multi-project. In a preferred embodiment, the user account database 26 also includes a restart feature that stores a user's progress in the design flow during a particular session, so that when the user logs back on, the user continues in the process flow where he or she left off.

The user typically begins the process of designing a custom chip by creating a netlist database 38. The design-specific database 24 is dynamic in that it stores custom design parameter values input by the user that mirror the statistics in the netlist database 38.

The rules database 28 contains sets of rules by which the CMS 10 guides the user to the process flow and validates compliance of each of the steps in the process flow. In one preferred embodiment, the rules database 28 includes user interface rules, flow compliance rules, electrical rules, and infrastructure rules. In an alternative embodiment, the rules may be stored in the design-specific database 24, rather than a separate rules database 28.

In operation, the user first logs into the CMS 10 and selects a particular project. Once the user is authenticated, the CMS 10 displays the main process flow screen that includes symbols representing different process flow steps and the sequence in which the steps should be performed, as shown in FIG. 2.

Figure 2:
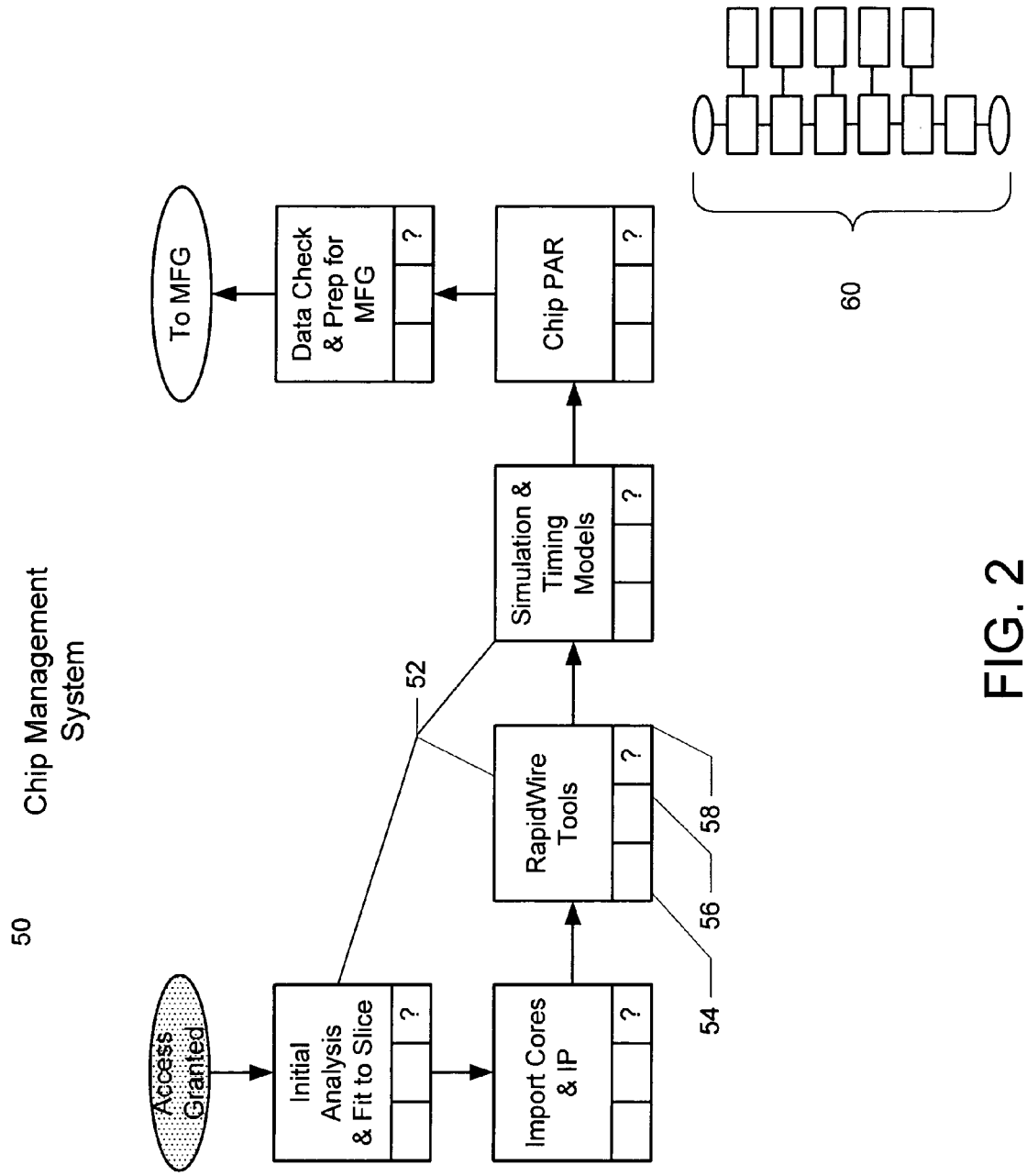
FIG. 2 is a block diagram illustrating an example main process flow screen of the CMS.

FIG. 2 is a block diagram illustrating an example main process flow screen of the CMS. In a preferred embodiment, the main process flow screen 40 displays the process flow steps needed to design a chip-based design as a series of process blocks 52. At the highest level, each process block 52 identifies steps needed to complete a task or tasks, and may have many sub-blocks/steps. Examples of tasks may include running an EDA tool, logging design milestones, reviewing reports, and so on. The rules in the rules database 28 define each block's 52 behavior and operation, including the required inputs and expected outputs.

In the example shown, top-level process blocks 52 for designing a chip are displayed, which include "Initial Analysis and Fit to Slice," "Import Cores and IP," "RapidWorks Tools," "Simulation and Timing Models," "Chip Place and Route," and "Data Check and Preparation for Manufacturing."

The "Initial Analysis and Fit to Slice" is the step where the user is prompted to enter initial design parameters in order to populate the design-specific database. The "Import Cores and IP" is the step where the user imports customer-specific or third party cores and intellectual property (IP) to establish circuit logic. The "RapidWorks Tools" is the step where the logic is wired together with third party tools. The "Simulation and Timing Models" is the step where the project coordinator 12 invokes the EDA tools 34 to simulate the finished design and where the user decides if the design meets requisite timing goals. The "Chip Place and Route" is the step where the project coordinator 12 invokes EDA tools 34 to perform cell placement and interconnect routing. And the "Data Check and Preparation for Manufacturing" is the step where the project coordinator 12 performs final validation and releases the design to manufacturing.

Although the preferred embodiment of the present invention shows the CMS 10 modeling the processing steps for designing a chip, the CMS 10 can be programmed to model any type of integrated circuit, such as an ASIC. For an ASIC design flow, the process blocks 52 displayed by the CMS may include "Entry of the Design," "Logic synthesis," "System Partitioning," "Prelayout simulation," "Floor Planning," "Placement," "Routing," "Circuit Extraction," and "Post Layout Simulation," for example.

Although multiple process blocks 52 are shown in the main design screen, the user cannot select certain blocks 52 unless prerequisite steps for those blocks 52 have been completed and verified as specified by the rules. If the user is starting a new chip design, for example, then the user would only be able to select the first process block, "Initial Analysis and Fit to Slice."

To aid the user in determining which blocks 52 have been successfully completed, each block 52 is provided with a status indicator 54 indicating completion status of each step. In a preferred embodiment, colors are used to indicate the current status of a block 52 (e.g., green indicates a completed step, yellow indicates an incomplete step, and red indicates a major error). However, text and/or icons are also suitable to indicate status. Each block 52 may also include a final report indicator 56 for listing the files that are ready for the user to review, and a help button 58 for displaying real-time help to the user for the current step.

Because each process block 52 may have nested levels of process screens, the user interface displayed to the user also includes a navigational tree 60 showing the thumbnail images of upper-level process blocks 52 to provide the user a quick reference as to which step or steps are currently being displayed in the main screen 50 in relation to the overall flow. The first column of a navigational tree 60 corresponds to the blocks 52 displayed in the main screen, the second column of the tree corresponds to the blocks 52 displayed in the second level, and so on. The thumbnails may be color-coded to indicate completed process blocks 52.

The user interface rules and the flow compliance rules work in conjunction to update the graphical GUI displayed to the user. For example, the flow compliance rules may include a record corresponding to each block 52 that indicates the next block 52 in process to be called, referred to as the successor, and the previous block 52, referred to as the predecessor. The record may also include fields indicating the color of the block 52, the name of the block 52, gifs displayed, a completed properly flag, and so on. The user interface rules accesses these records to render the user interface to the user's web browser 20.

Figure 3A:
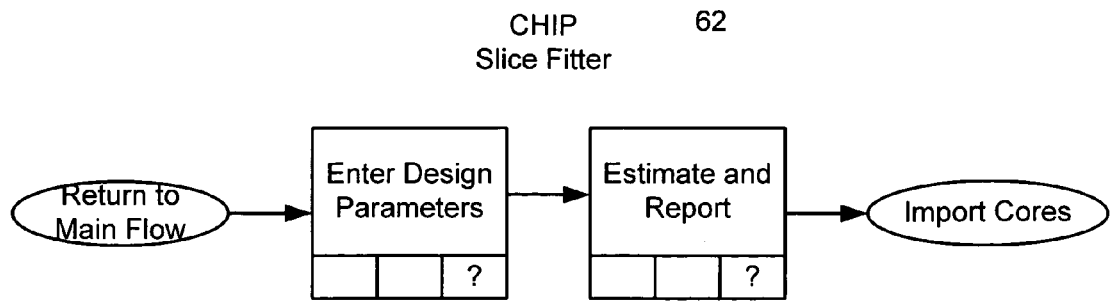
FIGS. 3A, 3B, and 5 are diagrams illustrating a "Slice Fitter" screen of the CMS in which the user populates the design-specific database.

In response to the user clicking on the "Initial Analysis and Fit to Slice" block, the project coordinator 12 will display a sub-level screen for this block 52, entitled "Slice Fitter", as shown in FIG. 3A.

FIG. 3A is a diagram illustrating the "Slice Fitter" screen 62 in which the user populates the design-specific database. The "Slice Fitter" screen 62 displays the process blocks, "Enter Design Parameters," and "Estimate And Report." The screen 62 also includes a link to return to the main design flow screen 50 and a link to proceed to the next step in the main design flow. Again, the flow depicted for this sub-level is chip-centric but can be altered to suit any design process. Within this "Slice Fitter" page 62, the user will click on "Enter Design Parameters" (EDP) block to continue.

Figure 4A:
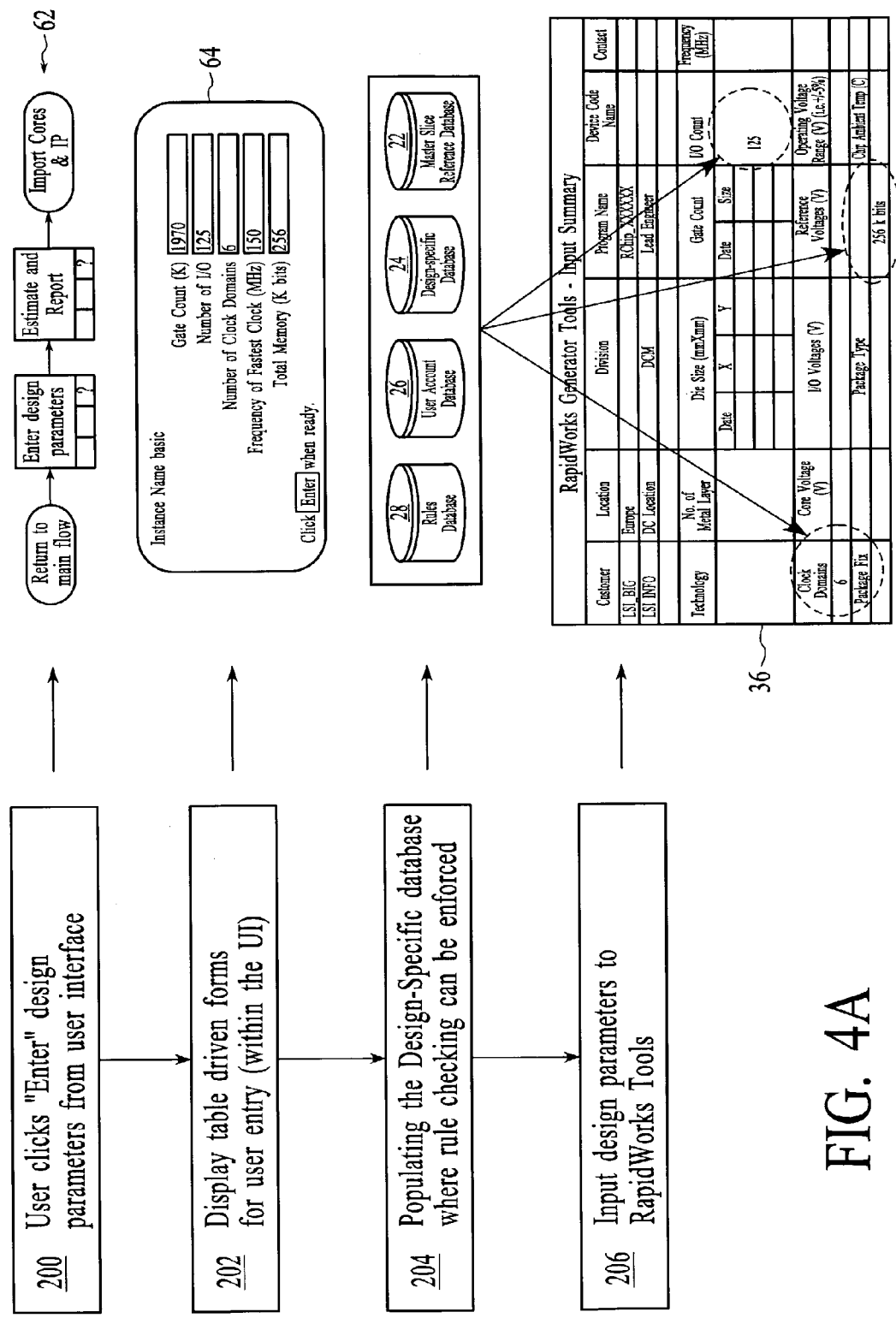
FIG. 4A is a flow diagram showing how design parameter information is entered, stored, and used by the CMS.

FIG. 4A is a flow diagram showing how the custom design parameter information is entered, stored, and used by the CMS 10. In response to the user clicking on "Enter Design Parameters" (EDP) block from the "Slice Fitter" screen 62 in step 200, the user is prompted to enter values for design parameters into a table-driven form 64 in step 202. The user may first select the type of parameters to input values for from a pull-down HTML menu. The different type of parameters may define different elements in the IC design, such as a processor, memory, etc., or allow the user to certain add elements, such as cells. In the example shown, the user has entered parameters values defining a cell, which include: gate count, number of I/O's, number of clock domains clock frequency, and total memory size. Once submitted, in step 204 the design-specific database is populated with the design parameter values, and the rules database 28 verifies that the parameters entered by the user comply with the appropriate electrical rules. Thereafter, in step 206 key design parameter values are input to the RapidWorks tools 36 (FIG. 1), which then input the values to the EDA tools 34.

Figure 3B:
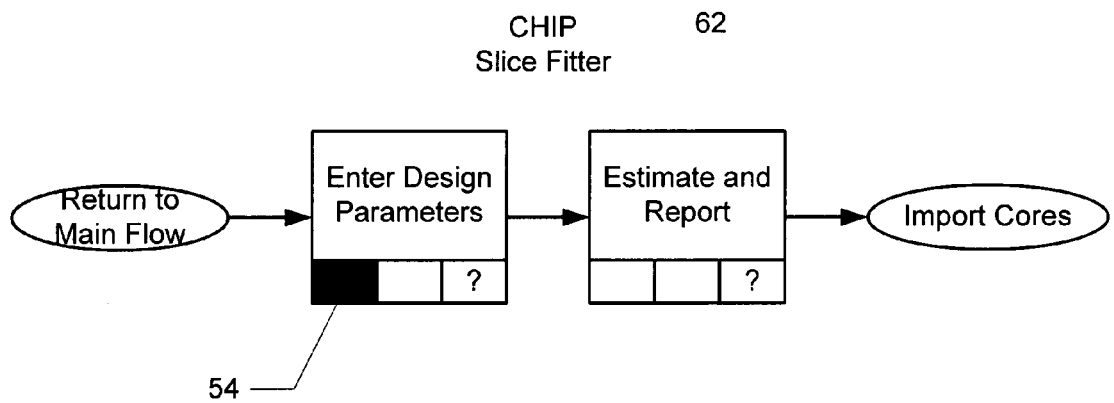

Referring to FIG. 3B, after the user has entered all requested parameter values, the status indicator 54 on EDP block will be displayed in green to indicate the step has been completed and performed correctly. The user may then proceed by clicking on the "Estimate and Report" block.

As described above, each slice in the master slice reference database 22 stores parameter values defining a master slice on which a custom chip may be built. The "Estimate and Report" block analyzes the design parameter values entered by the user to determine which ones of the available master slices most closely match the custom design. To do this, algorithms in the project coordinator 12 compare the input parameter values for the custom design with the values of the corresponding parameters of the reference master slice. After the comparison, a screen is displayed to the user showing the input design parameters values compared to the values for the parameters of the closest matching master slices.

FIG. 4B is a diagram illustrating the comparison of an example custom design with master slices. Based on the comparison, the user is shown which master slice best "fits" the custom design. This is the master slice on which his or her custom design will be built. In this example, the input design parameter values fit master slice "L79304," which falls between a smaller and a larger master slice. The user may then choose to downsize his or her design by decreasing the design parameters values and selecting the smaller master slice, or can choose to spend additional funds on the larger and more costly master slice.

Figure 5:
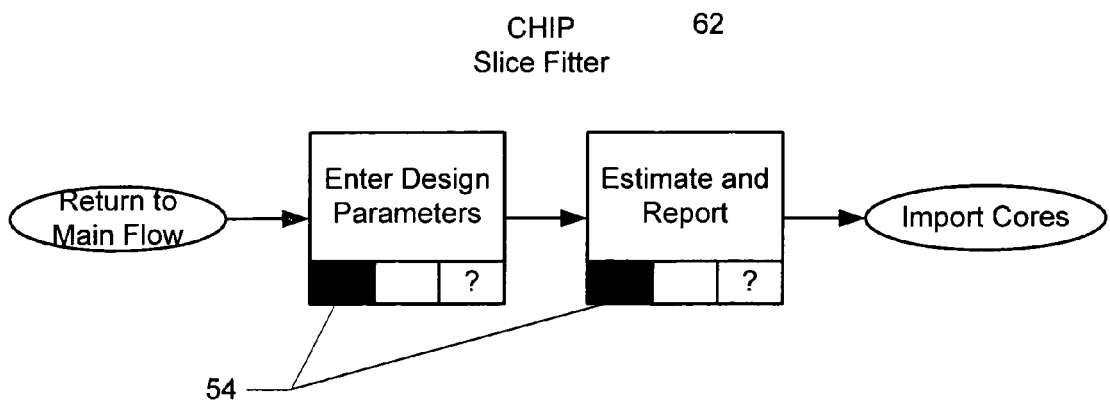

Once one of the best fitting master slices is selected, the "Estimate and Report" block accesses the business system database 32 to check the business conditions and also queries manufacturing to retrieve inventory status for the selected reference design (e.g., to determine if the necessary number of wafers are available, etc.). Assuming the business conditions and inventory status are favorable, key input design parameters are output to the RapidWorks tools 36 and the status indicator 54 on the "Estimate and Report" block will change to green to indicate completion, as shown in FIG. 5.

Referring again to FIG. 2, the user may then return to the main process flow screen, which by now would display a green status indicator 54 on "Initial Analysis and Fit to Slice" block 52. The top-level and sub-level thumbnails in the navigational tree 60 corresponding to the "Initial Analysis and Fit to Slice" block 52 are likewise displayed in green.

Figure 6:
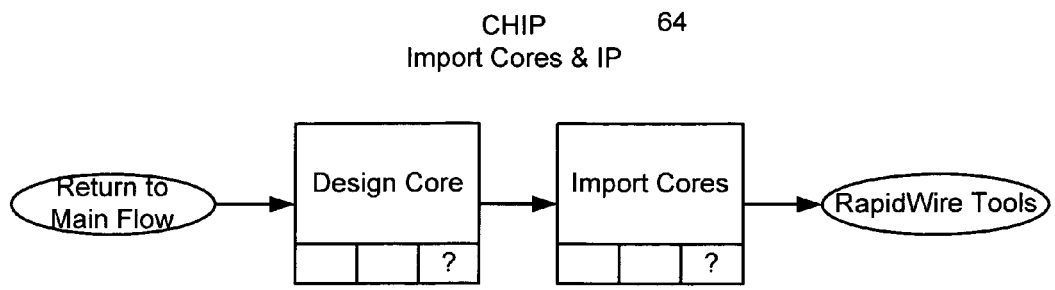
FIG. 6 is a diagram illustrating the "Import Cores and IP" screen displayed by the CMS.

The flow compliance rules in the rules database 28 now allows the user to proceed to the next step in process flow, which in this case is "Import Cores and IP." Once the user clicks on the "Import Cores and IP" block 52, a sub-level "Import Cores and IP" screen is displayed, as shown in FIG. 6.

FIG. 6 is a diagram illustrating the "Import Cores and IP" screen, which includes two processing blocks 52, "Design Cores" and "Import Cores." Assuming that the "Import Cores and IP" process block represent a known flow and methodology for programming a FPGA, for example, then the user is guided through this flow by drag and drop of intelligent flow blocks 52. Note that connections are only permitted where appropriate and that the various steps are also order dependent.

In a preferred embodiment, in response to the user clicking on the "Design Core" block, the user is prompted to run a deterministic flow, referred to as "Fusion" (not shown), that guides the user through assembling and loading an FPGA (VGA controller). The Fusion process may include the following processing blocks: FPGA Express, NGD Build, MAP, Place and Route, Bit Gen, and Load, which are well-known in the art. Different EDA tools 34, which are invoked by the project coordinator 12, may implement each of these steps. The FPGA Express block synthesizes the net list from VHDL to gates in real-time within an FPGA development kit. The NGD Build block converts the gates to a net list format to pass to the next step, MAP, which then optimizes the net list for the FPGA. The Place and Route block assures that the desired timing can be met, and may choose a different interconnect scheme to achieve that timing. The BitGen block takes all of the information and converts it into a bit stream that will program a Xilinx part to become a VGA controller, which is about a 50K gate function. The Load block downloads the bit stream to the FPGA hardware board, and the results are displayed to the user.

At this point it should be understood that the CMS 10 acts as a software wrapper for third party design tools 30, which are invoked by the project coordinator 12. That is, the project coordinator 12 is designed to invoke the third party tools, supply the necessary input to the tools, and check compliance of the custom design with the output of the design tools 30. The project coordinator 12 checks compliance of the custom design in one of two ways. The project coordinator 12 may either read the tool's compiler constraints and compare the constraints to the parameter values of the design, or the project coordinator 12 may read the return codes of the tools 30, which either indicate successful completion or an error.

The FPGA design flow can be saved and reused, and at the end of the process, a core is associated with the user's account that can be use at chip level. At the end of the Fusion flow, a form with a time of day stamp is displayed and a prompt for the user to return to design flow. This will return the user to the Import Cores & IP page with green status indicators 54 for both the "Design Core" block and "Import Cores" block.

Referring again to FIG. 2, for brevity, it will be assumed that after the user has completed the "Import Cores and IP" block, the user completed the"RapidWorks Tools" block and the "Simulation & Timing Models" block, and that both are updated U display a green status indicator 54. This indicates that the RapidWorks tools 36 have been passed the proper data and that the simulation and timing models are acceptable. The custom design now has all the necessary information for the user to proceed with the remaining steps in the design.

When the user clicks on "Chip PAR (Place And Route)" block, an audit function of all supplied data will be invoked. In other words, this is the final check of all design data (RTL, logic DRC, timing constraints, resources used on master slice, etc.), and upon user acceptance, the final PAR can begin. A CHIP Estimator may be launched to check all the data and recalculate all the design files. A report may be displayed similar report to the original Slice Fitter report with updated/appended information providing the user a snap-shot of the original custom design parameter settings vs. the current design statistics. FIG. 7 is a diagram illustrating an example of the chip estimator report. Note that in the report, the selected reference design or master slice may have changed from the original. As long as the report shows that the current custom design parameters do not exceed the resources of the selected reference design, the user may proceed as intended.

Once all of the status indicators 54 in the main design flow are green, the user may release the custom design to manufacturing. Navigation to this step can be accomplished at the main design flow screen 50 or in lower level pages, demonstrating the flexibility of the environment and the ability to quickly check status.

Figure 8:
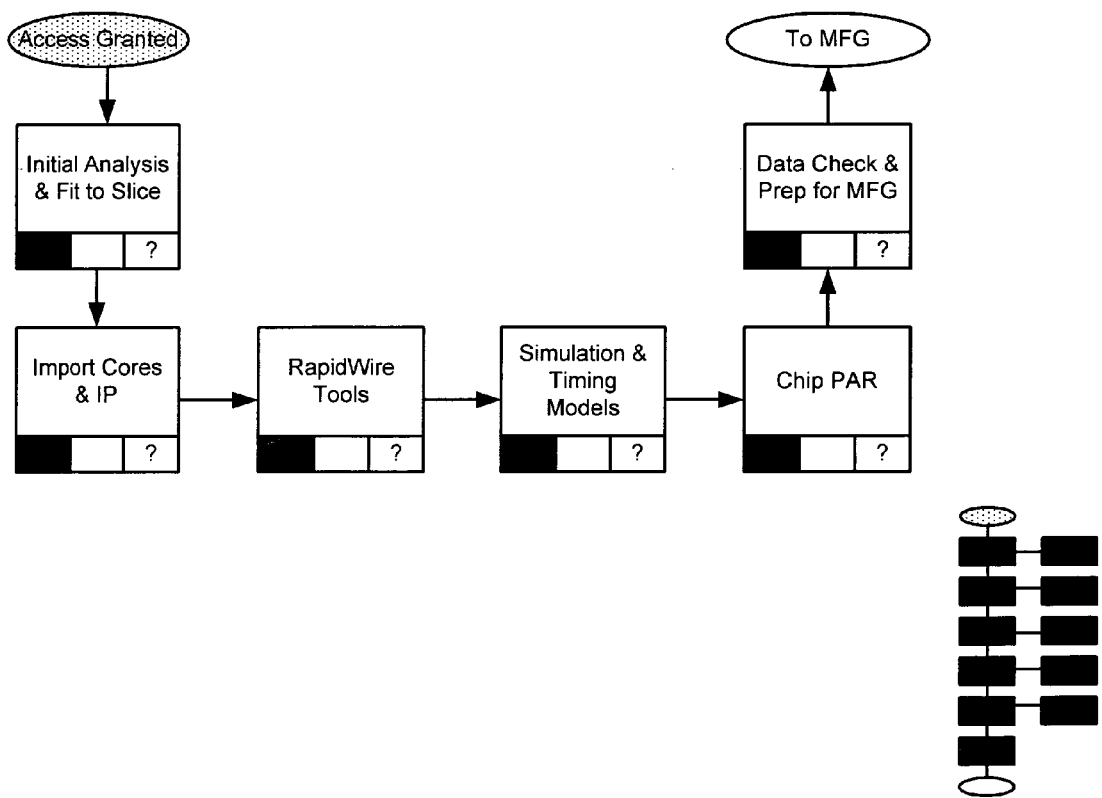
FIG. 8 is a diagram illustrating the main design flow screen after the user has released the custom design to manufacturing.

FIG. 8 is a diagram illustrating the main design flow screen 50 after the user has released the custom design to manufacturing. All process block status indicators 54 now show completion, as well as the corresponding thumbnails in the navigational tree 60.

Thus, the present invention takes an IC design flow, breaks it down into manageable blocks 52, makes the blocks 52 intelligent through programming, and makes the blocks 52 available to the user. Additionally, as this flow is based on MetaStream, the EDA tools 34 may include regular simulators, hardware simulators, or both. The following is a list showing the third party design tools used in a preferred implementation of the CMS 10 of the present invention:

TABLE I

| Tool name | Description | Qualified tool versions |
|---|---|---|
| 3RD PARTY TOOLS | | |
| Floorplanning | | |
| Jupiter DP | Avanti floorplanning tool | 2000.2.3.4.0.8.4 (non Gflx), 2000.2.3.4.0.9.6 (Gflx or FS3.2) |
| Planet PL | Avanti floorplanning tool | 2000.2.3.4.0.7.2 (FS202 only) |
| Physical Optimization | | |
| Physical Compiler | Synopsys physical synthesis tool | 2001.08 (Support only for alpha engagements in FS3.1), 2002.05 |
| PKS | Cadence physical synthesis | v4.0-s011 |
| Saturn | Avant resynthesis tool | 2000.2.3.4.0.7.2 (FS202 only) |
| Layout/DNE | | |
| Apollo/ApolloII | Avanti's P&R tool | 2000.2.3.4.0.8.4 (non Gflx), 2000.2.3.4.0.9.6 Gflx or FS3.2 |
| MilkyWay, MilkyWayMT | Avanti's baseline tool-DB access | 2000.2.3.4.0.8.4 (non Gflx), 2000.2.3.4.0.9.6 (Gflx or FS3.2) |
| Calibre | Mentor's DRC/LVS tool | 8.7_30.3 |
| IC station/graph | Mentor's polygon editor | |
| Design REV | Mentor's new polygon editor | Not supported by DTD and FS |
| Mentor RVE | Mentor's links to Avanti | Not supported by DTD and FS |
| Astro | Avanti's new P&R tool | Not supported by DTD and FS |
| Test | | |
| Synopsys Tetramax | Scan ATPG tool, used for generating patte + B170rns for Stuck-At Faults | 2001.08 |
| Mentor Fastscan | Scan ATPG tool, used for generating patterns for Stuck-At Faults and IDDQ faults | v8.9–5.10 |
| Mentor DFTAdvisor | Used for Scan Insertion and stitching | v8.9–5.10 |
| Mentor FA | Failure Analysis tool, that reads tester scan datalog | v8.9–5.10 |
| LogicVision RAMBIST | RAM Bist controller insertion and pattern generation tool | 4.0b |
| LogicVision JTAG | TAP controller/Boundary scan insertion and JTAG pattern generation tool | 4.0b |
| Signal Integrity | | |
| Gatescope | Moscape Crosstalk analysis | 2.0.8 |
| Star-RCXT | Avanti | 2002.2.r08 |
| Quickcap | Internal DTD use only | |
| Power | | |
| MarsRail (3rd party) | IR drop analysis (Avanti) | 2000.2.3.4.0.8.4 (non Gflx), 2000.2.3.4.0.9.6 (Gflx or FS3.2) |
| Wattwatcher | Gate-level, RTL, simulation-driven power analysis | 2000.4.5 (all FS3X releases) |
| Voltage Storm | Simplex | 3.1.1 |
| Voltage Storm SOC Clock | Simplex | 3.1.1 |
| clockwise | Celestry's Useful skew based Clock Tree Synthesis Tool | 1.1.7c (Support dropped from FS) |
| Design Verification | | |
| PrimeTime | Synopsys STA | 2000.11-SP1/SP2, 2002.03 |
| Formality | Synopsys formal verification | 2000.05-FM1.4, 2000.11-FM1-SP2, 2001.06-FM1.0 |
| Verilog XL | Cadence sim | 2.7, 3.2s014, 3.3, 3.4 |
| NC Verilog | Cadence sim | 3.0s024, 3.2s014, 3.3, 3.4 |
| NC Sim | Cadence sim | 3.3, 3.4 |
| ModelSim | Mentor simulator | 5.5b, 5.5e(including mixed mode), 5.6 |
| VCS | Synopsys sim | 5.2, 6.0, 6.1 (6.1: 32-bit & 64-bit) |
| Tuxedo Verplex LEG | Formal verification | 2.0.3.4 |
| IKOS | IKOS | 3.1-restricted release: contact technical Product Marketing |
| Synthesis | | |
| Design Compiler | Synopsys logic synthesis | 2000.05 and 2000.11(Presto HDL compiler is not qualified in this version), 2001.08, 2002.05 |
| Build gates | Cadence logic synthesis | 4.0-s002 |
| Software QA | | |
| Remedy | Bug reporting tool | ARWeb v3.0.2; Remedy Unix 4.0.1 patch 876 |

A method for guiding a user through a process design flow has been described, which illustrates the value of the MetaStream-based CMS of the present invention the inclusion of an entire process flow into an intuitive and easy to use user design environment.

The present invention has been described in accordance with the embodiments shown, and one of ordinary skill in the art will readily recognize that there could be variations to the embodiments, and any variations would be within the spirit and scope of the present invention. In addition, software written according to the present invention may be stored on a computer-readable medium, such as a hard drive, or on a removable memory, and loaded into the server for execution. Accordingly, many modifications may be made by one of ordinary skill in the art without departing from the spirit and scope of the appended claims.

What is claimed is:

1. A web-based expert system for automatically guiding a user through a design flow for a chip, the method comprising:
   (a) displaying a design flow user interface on a user's computer, where the user interface includes symbols for user selection corresponding to a sequence of design flow process steps, the steps including any combination of "Initial Analysis and Fit to Slice," "Import Cores and IP" "RapidWorks Tools," "Simulation and Timing Models," "Chip Place and Route," and "Data Check and Preparation for Manufacturing", wherein once selected at least a portion of the design flow process steps require the user to enter input;
   (b) defining the design flow process steps with a set of rules, and analyzing whether the user input for each step requiring user input complies with the rules; and
   (c) allowing the user to proceed to a next step in the sequence of design flow process steps if it is determined that previous steps have been completed successfully.

2. The method of claim 1 wherein step (a) further includes the step of: providing each process block with nested levels of process screens.

3. The method of claim 2 wherein step (a) further includes the step of: displaying on the user interface a navigational tree showing the thumbnail images of upper-level process blocks to provide the user a quick reference as to which step is being displayed in relation to the overall flow.

4. The method of claim 3 wherein step (a) further includes the step of: displaying color-coded thumbnails to indicate completed process blocks.

5. A computer-readable medium containing programming instructions for a web-based expert system that automatically guides a user through a design flow for a chip, the program instructions for:
   (a) displaying a design flow user interface on a user's computer, where the user interface includes symbols for user selection corresponding to a sequence of design flow process steps, the steps including any combination of "Initial Analysis and Fit to Slice," "Import Cores and IP," "RapidWorks Tools," "Simulation and Timing Models," "Chip Place and Route," and "Data Check and Preparation for Manufacturing", wherein once selected at least a portion of the design flow process steps require the user to enter input;
   (b) defining the design flow process steps with a set of rules, and analyzing whether the user input for each step requiring user input complies with the rules; and
   (c) allowing the user to proceed to a next step in the sequence of design flow process steps if it is determined that previous steps have been completed successfully.

6. The computer-readable medium of claim 5 further including the instruction of guiding the user through a design flow for an ASIC, wherein the design flow process instructions include "Entry of the Design," "Logic synthesis," "System Partitioning," Prelayout simulation," "Floor Planning," "Placement," "Routing," "Circuit Extraction," and "Post Layout Simulation".

7. The computer-readable medium of claim 5 further including the instruction of defining the design flow process instructions to include design, business systems including inventory status updates, and release to manufacturing instructions, such that the expert system manages both the design and manufacturing of the integrated circuit.

8. The computer-readable medium of claim 7 wherein the symbols are displayed as process blocks, instruction (a) further including the instruction of: displaying a status indicator in each process block indicating completions status of that block to the user.

9. The computer-readable medium of claim 8 wherein instruction (a) further includes the instruction of: providing each process block with nested levels of process screens.

10. The computer-readable medium of claim 9 wherein instruction (a) further includes the instruction of: displaying on the user interface a navigational tree showing the thumbnail images of upper-level process blocks to provide the user a quick reference as to which instruction is being displayed in relation to the overall flow.

11. The computer-readable medium of claim 10 wherein instruction (a) further includes the instruction of: displaying color-coded thumbnails to indicate completed process blocks.

* * * * *